Patented Jan. 6, 1953

2,624,666

UNITED STATES PATENT OFFICE 2,624,666

HERBICIDAL COMPOSITION

Milton Kosmin and Arthur H. Schlesinger, Dayton, Ohio, assignors to Monsanto Chemical Company, St. Louis, Mo., a corporation of Delaware No Drawing. Application October 24, 1951, Serial No. 252,981

4 Claims. (Cl. 71—2.7)

The present invention provides new and highly valuable herbicidal compositions and methods of destroying or preventing plant growth in which such compositions are employed.

We have found that improved, very efficient herbicidal compositions are obtained when there are prepared oil-in-water emulsions of bis(trichloromethyl) sulfone. The emulsions may be obtained by first dissolving the sulfone in an organic material which is a solvent therefor and then mixing the organic solution with water in the presence of an emulsifying agent. Because of the high toxicity of the sulfone against living plants and the efficiency with which organic solutions of the same may be dispersed in an aqueous vehicle, extremely good herbicidal properties are evidenced by having only very small concentrations of the sulfone, for example, concentrations of from 0.1 per cent to 2 per cent by weight of the total weight of the emulsion.

Emulsifying agents which may be employed are those customarily used in the art for the preparation of oil-in-water emulsions, e. g., ionic or non-ionic emulsifying or dispersing agents such as the long-chain alkylbenzenesulfonates, or polyglycol ethers. The emulsifying agents are likewise employed in only very small concentrations, say, in a quantity of from 0.05% to 2.0% by weight of the total weight of the emulsion, and hence do not affect the chemical stability of the sulfone.

The herbicidal efficiency of the present oil-in-water emulsions of bis(trichloromethyl) sulfone is surprising, for as will hereinafter be disclosed, similarly prepared emulsions of bis(dichloromethyl) sulfone possess substantially no herbicidal effect.

Bis(trichloromethyl) sulfone is a readily obtainable compound, being easily prepared by the chlorination of thiodiglycolic acid, $S(CH_2COOH)_2$, substantially as described in the copending application of William R. James, Serial No. 218,708, filed March 31, 1951.

The present invention is further illustrated, but not limited, by the following examples.

Example 1

Spray testing of the present herbicidal composition was conducted as follows:

A cyclohexanone solution of bis(trichloromethyl) sulfone was prepared. This solution and an emulsifying agent were added to water, the quantity of solution employed being calculated to give emulsions containing 1.0 per cent and 0.3 per cent by weight, respectively, of the sulfone based on the weight of the total emulsion. The quantity of emulsifying agent used was 0.2 per cent by weight, based on the weight of the total emulsion. Said emulsifying agent comprised a mixture of a polyalkyleneglycol derivative and an alkylbenzenesulfonate.

Three-week old corn and bean plants were sprayed with the respective emulsions, two plants of each variety being employed. The spraying was continued until droplets formed on and/or fell from the foliage and stems of the sprayed plants, up to 15 ml. of the aqueous suspension being applied to each plant. The sprayed plants as well as two untreated "blank" specimens of each plant were then allowed to remain under standard conditions of sunlight and watering for a period of one week. At the end of that time the sprayed plants were compared with the untreated plants in order to determine the extent of injury, if any. The following observations were made.

| Percent Concentration of Sulfone | Effect On— | |
|---|---|---|
| | Bean | Corn |
| 0.3 | Slight injury | Severe injury, leaves dried. |
| 1.0 | Severe injury, leaves dried. | Plant dead, leaves dried. |

Example 2

The herbicidal activity of bis(trichloromethyl) sulfone was determined by germination of cucumber seeds, for 4 days at a temperature of 76° F. in the presence of an aqueous emulsion of the sulfone at a concentration of 100 p. p. m. Fifty seeds were used for each of two duplicate tests. The results are expressed as per cent length of the primary roots in the presence of the chemical as compared with the length of the primary roots of controls which had been germinated in water. The activity of a number of related compounds as obtained by the same testing procedure are included for comparison.

The following results were obtained:

| Compound Tested | Percent Growth at 100 p. p. m. |
|---|---|
| Bis(trichloromethyl) sulfone | 7 |
| Bis(dichloromethyl) sulfone | 68 |
| 2-Chloroethyl n-octyl sulfone | 97 |
| Bis(2-hydroxyethyl) sulfone | 102 |

While bis(trichloromethyl) sulfone is most advantageously used as a herbicide when incorporated into an oil-in-water emulsion, it may also be used in other plant destroying methods. Thus it may be mixed with solid carriers such as clay, talc, pumice and bentonite to give herbicidal compositions which may be applied in toxic quantities to undesired plant growth. The sulfone may also be mixed with liquid or solid agricultural pesticides, e. g., insecticides and/or fungicides. While solutions of the sulfone in organic solvents therefor may be employed as herbicidal compositions, we have found that the oil-in-water emulsions of the sulfone possess an improved tendency to adhere to plant foliage, and that the emulsions require less of the sulfone to give comparable herbicidal efficiency than do the organic solutions or the dry mixtures.

What we claim is:

1. A herbicidal composition comprising an oil-in-water emulsion of bis(trichloromethyl) sulfone.

2. A herbicidal composition comprising bis(trichloromethyl) sulfone, an organic solvent therefor, water, and an emulsifying agent.

3. The method of destroying undesirable plants which comprises applying to said plants a toxic quantity of a herbicidal composition comprising bis(trichloromethyl) sulfone as the essential active ingredient.

4. The method of destroying undesirable plants which comprises applying to said plants an oil-in-water emulsion of bis(trichloromethyl) sulfone.

MILTON KOSMIN.
ARTHUR H. SCHLESINGER.

No references cited.